United States Patent
Rhu et al.

(10) Patent No.: US 12,055,226 B2
(45) Date of Patent: Aug. 6, 2024

(54) DIRECTIONAL CONTROL HYDRAULIC VALVE AND SYSTEM INCLUDING SAME

(71) Applicant: HANVIT INDUSTRIES CO., LTD., Incheon (KR)

(72) Inventors: Ha Kee Rhu, Seoul (KR); Jin Mo Kim, Incheon (KR); Kang Wan Yun, Incheon (KR); Byung-Kwan Choi, Incheon (KR)

(73) Assignee: HANVIT INDUSTRIES CO., LTD., Incheon (KR)

(*) Notice: Subject to any disclaimer, the term of this patent is extended or adjusted under 35 U.S.C. 154(b) by 80 days.

(21) Appl. No.: 17/931,847

(22) Filed: Sep. 13, 2022

(65) Prior Publication Data
US 2023/0003307 A1    Jan. 5, 2023

Related U.S. Application Data

(63) Continuation of application No. PCT/KR2020/016324, filed on Nov. 19, 2020.

(30) Foreign Application Priority Data

Nov. 13, 2020    (KR) .................. 10-2020-0151993

(51) Int. Cl.
*F16K 11/22*    (2006.01)
*F15B 13/04*    (2006.01)
(Continued)

(52) U.S. Cl.
CPC .......... *F16K 11/22* (2013.01); *F15B 13/0401* (2013.01); *F16K 11/24* (2013.01);
(Continued)

(58) Field of Classification Search
CPC ........ F16K 11/161; F16K 11/22; F16K 11/18; F16K 11/24; F16K 31/0624;
(Continued)

(56) References Cited

U.S. PATENT DOCUMENTS 5,143,119 A * 9/1992 Plangger ................. F01D 17/26
                                                          251/30.01
5,203,373 A * 4/1993 Austin, Jr. .............. F16K 31/62
                                                          137/637.1
(Continued)

FOREIGN PATENT DOCUMENTS

JP    2018-077796 A    5/2018
KR    10-1366382 B1    3/2014
(Continued)

OTHER PUBLICATIONS

International Search Report issued in PCT/KR2020/016324; mailed Jul. 14, 2021.

*Primary Examiner* — Umashankar Venkatesan
(74) *Attorney, Agent, or Firm* — Studebaker & Brackett PC

(57) ABSTRACT

Proposed are directional control hydraulic valves and a system including the same, the system including: a first valve controlling a flow of a fluid flowing thereinto from a first input port by being interlocked with a solenoid valve that is switched to an excited (on) state or non-excited (off) state; and a second valve connected to the first valve and controlling a flow of the fluid flowing thereinto from the first valve by a fluid flowing thereinto from a second input port or a third input port, wherein at least a part of the fluid having been passed through the first valve is discharged through a first output port and then flows into the second input port or the third input port. In addition, the system including at least two directional control valves may be provide, whereby multiplexing of the system may be implemented.

13 Claims, 8 Drawing Sheets

(51) Int. Cl.
  *F16K 11/24*  (2006.01)
  *F16K 31/06*  (2006.01)
  *F16K 31/122*  (2006.01)

(52) U.S. Cl.
  CPC ...... *F16K 31/0624* (2013.01); *F16K 31/1221* (2013.01); *F15B 2211/30525* (2013.01)

(58) Field of Classification Search
  CPC ............... F16K 31/1221; F15B 20/008; F15B 13/0401; F15B 2211/30525
  See application file for complete search history.

(56) References Cited

U.S. PATENT DOCUMENTS

| | | | | |
|---|---|---|---|---|
| 6,435,202 | B2* | 8/2002 | Zachary | G05B 9/03 |
| | | | | 251/30.01 |
| 8,151,813 | B2* | 4/2012 | Jacoby | G05B 9/03 |
| | | | | 251/30.01 |
| 9,896,962 | B2* | 2/2018 | Wojick | F01D 21/18 |
| 10,480,346 | B2* | 11/2019 | Leykauf | F15B 20/001 |
| 10,746,317 | B2* | 8/2020 | Kolbenschlag | F15B 13/0442 |
| 10,870,920 | B2* | 12/2020 | Okura | C23C 16/45587 |

FOREIGN PATENT DOCUMENTS

| | | |
|---|---|---|
| KR | 10-2083270 B1 | 3/2020 |
| KR | 10-2135787 B1 | 7/2020 |
| WO | 2008/128326 A1 | 10/2008 |

\* cited by examiner

Normal Operation / Solenoid On

DIRECTIONAL CONTROL HYDRAULIC VALVE AND SYSTEM INCLUDING SAME

CROSS REFERENCE TO RELATED APPLICATION

This application is a Continuation of International Application No. PCT/KR2020/016324, filed on Nov. 19, 2020, which claims priority to and the benefit of Korean Patent Application No. 10-2020-0151993, filed on Nov. 13, 2020, the entire contents of which are incorporated herein by reference.

TECHNICAL FIELD

The present disclosure relates to a directional control hydraulic valve and a system including the same.

BACKGROUND ART

In various industries that use hydraulic pressure as a power source, stable operation of a hydraulic system may improve productivity and secure safety. In particular, in operating a high-load and large-capacity machine, an application of the hydraulic system is essential, and a system error due to a failure of any one element may lead to large human and material losses.

In this regard, various types of hydraulic trip systems have been introduced, but in particular, a circuit for implementing a generally used 2 out of 2- or 2 out of 3-type trip system among the trip systems is complex, and in order to implement the circuit, multiple elements each performing different functions are required.

In addition, the trip system should always maintain a controlled state and operate on a trip signal that occurs intermittently. However, in a long-term system maintenance state, when a valve malfunctions in a situation other than a normal trip signal due to a defect, which is caused by a solenoid failure or sticking thereof, unnecessary loss occurs.

DISCLOSURE

Technical Problem

Accordingly, the present disclosure has been made keeping in mind the above problems occurring in the related art, and a technical problem to be solved by the present disclosure is to provide directional control hydraulic valves of an opening/closing method through a line contact.

In addition, the present disclosure has been made keeping in mind the above problems occurring in the related art, and a technical problem to be solved by the present disclosure is to provide an overall system including the directional control hydraulic valves.

The problems of the present disclosure are not limited to the problems mentioned above, and other problems not mentioned will be clearly understood by those skilled in the art from the following description.

Technical Solution

In order to accomplish the above objectives, there may be provided a directional control hydraulic valve system including directional control hydraulic valves in which any one directional control hydraulic valve is connected to at least two other directional control hydraulic valves, wherein each of the directional control hydraulic valves includes: a first valve configured to control a flow of a fluid flowing thereinto from a first input port, by being interlocked with a solenoid valve that is switched to an excited (on) state or non-excited (off) state; and a second valve connected to the first valve and configured to control a flow of the fluid flowing thereinto from the first valve, by a fluid flowing thereinto from a second input port or a third input port, wherein at least a part of the fluid having been passed through the first valve is discharged through a first output port and then flows into the second input port or the third input port.

At this time, the system may further include: a trip valve configured to control whether performing an emergency stop of the system or not by being interlocked with the directional control hydraulic valves, wherein, when at least three of the directional control hydraulic valves are provided, the trip valve may operate only when at least two of the solenoid valves respectively included in the directional control hydraulic valves, are in a non-excited state.

In addition, in order to accomplish the above objectives, there may be provided a directional control hydraulic valve, the valve including: a first valve configured to control a flow of a fluid flowing thereinto from a first input port by being interlocked with a solenoid valve that is switched to an excited (on) state or non-excited (off) state; and a second valve connected to the first valve and configured to control a flow of the fluid flowing thereinto from the first valve by a fluid flowing thereinto from a second input port or a third input port, wherein at least a part of the fluid having been passed through the first valve may be discharged through a first output port and then flows into the second input port or the third input port.

At this time, the first valve may include: a first plunger configured to be displaced by the fluid flowing thereto from the first input port or by the solenoid valve; a first piston configured to be displaced by the fluid flowing thereto from the first input port or restoring force of a first elastic body; a first body configured to be displaced by the first plunger and the first piston and to determine the flow of the fluid flowing thereinto from the first input port according to an amount of displacement thereof; and a first seat configured to be brought into contact with the first body as the first body is displaced, thereby determining the amount of displacement of the first body.

At this time, the first valve may include: a first line configured to provide the fluid flowing thereinto from the first input port with a movement path; a second line branched off from the first line to provide a path in a direction of a first plunger; and a third line branched off from the first line or the second line to provide a path in a direction of the first piston.

Alternatively, the first body, in order to be in line contact, as being moved, with a part of the first seat, may have a cross section provided in a circular or wedge shape or is provided in a poppet type.

In addition, the second valve may include: a second plunger configured to be displaced by the fluid flowing thereto from the first input port; a second piston configured to be displaced by the fluid flowing thereto from the second input port or restoring force of a second elastic body; a third piston configured to be displaced by the fluid flowing thereto from the third input port or by restoring force of a third elastic body; a second body configured to be displaced by at least one of the second plunger, the second piston, and the third piston and to determine a flow of the fluid flowing thereinto from the first valve according to an amount of displacement thereof; and a second seat configured to be brought into contact with the second body as the second body is displaced, thereby determining the amount of displacement of the second body.

At this time, the first valve may include a fourth line configured to provide a path in a direction of the second plunger by being branched off from the first line that provides the fluid flowing thereinto from the first input port with a movement path.

Alternatively, the second valve may include an eighth line configured to provide the fluid flowing thereinto from the second input port with a path in a direction of the second piston.

Alternatively, the second valve may include a ninth line configured to provide the fluid flowing thereinto from the third input port with a path in a direction of the third piston.

Alternatively, the second body, in order to be in line contact, as being moved, with a part of the second seat, may have a cross section provided in a circular or wedge shape or be provided in a poppet type.

In addition, the valve may further include a fifth line configured to provide the fluid having passed through the first valve with a path in a direction of the first output port.

At this time, the valve may further include a sixth line configured to provide a path in a direction of the second valve by being branched off from the fifth line.

In addition, the valve may further include a seventh line configured to provide a path through which the fluid having passed the second valve is discharged to the second output port.

Advantageous Effects

As described above, the directional control hydraulic valves and the system including the same according to the present disclosure have the following effects.

First, even when there occurs a phenomenon such that some of a plurality of solenoid valves are switched due to faults thereof, a trip system does not operate and a turbine can be maintained under control.

Second, separate maintenance or testing is possible for only some of the solenoid valves among the plurality of solenoid valves.

Third, compared with the related art, manufacturing and maintenance are advantageous by unifying elements.

Fourth, by removing a gap between a body and a seat of the directional control hydraulic valve, it is possible to prevent foreign substances from being introduced and fixed.

Fifth, it is possible to minimize a leakage phenomenon that proceeds through the gap between the body and the seat of the directional control hydraulic valve.

Sixth, by preventing the sticking of foreign substances and the leakage phenomenon, it is possible to improve the reliability of the directional control hydraulic valve.

Seventh, even when a phenomenon occurs that some of the plurality of solenoid valves are not switched even in a trip signal due to the sticking thereof, when at least two valves are operated, a normal trip system can be operated.

Effects of the present disclosure are not limited to the effects mentioned above, and other effects not mentioned will be clearly understood by those skilled in the art from the description of the claims.

DESCRIPTION OF DRAWINGS

In addition.

MODE FOR INVENTION

Figure 1:
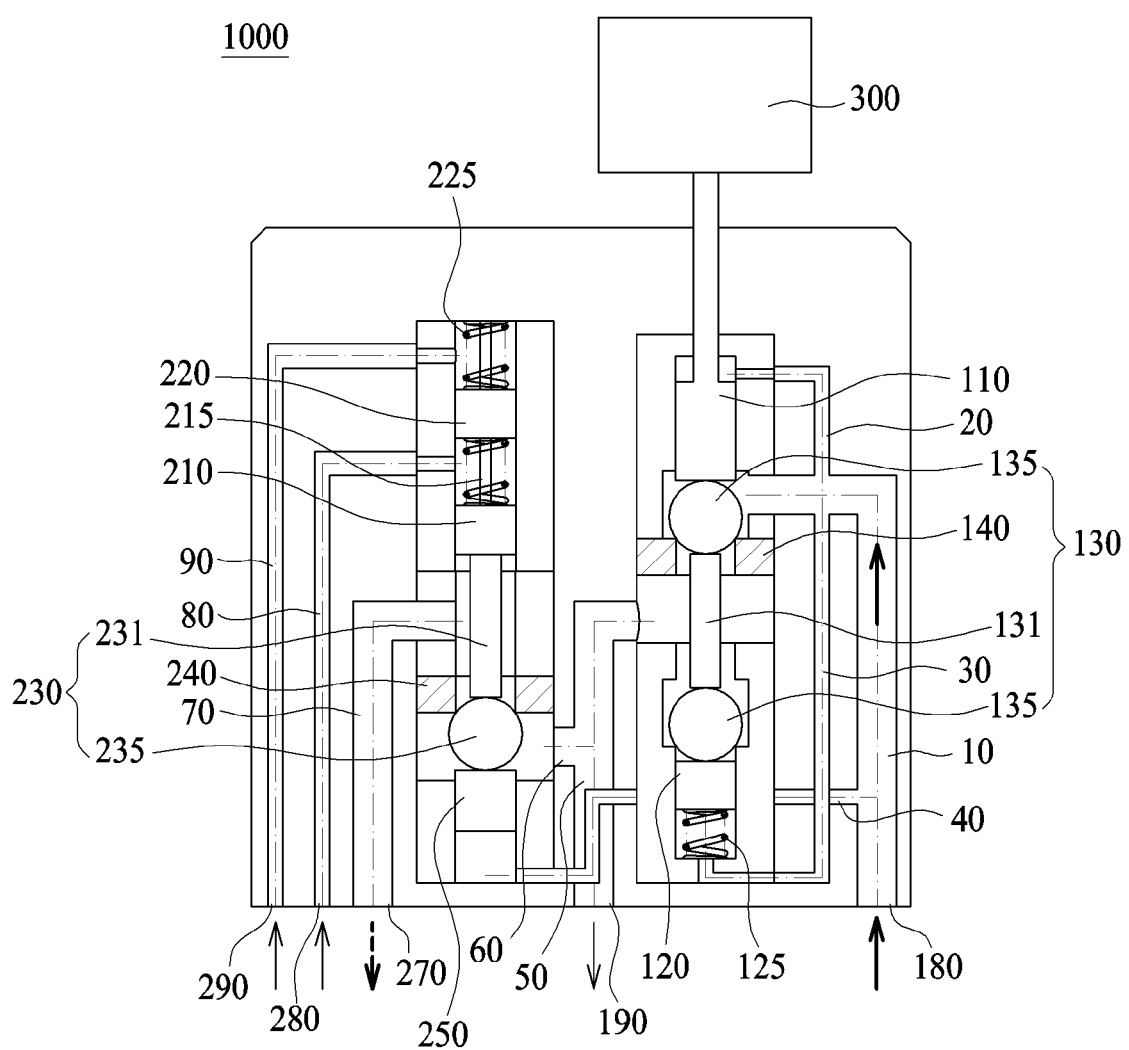
FIG. 1 is a view showing a state and a fluid flow of a directional control hydraulic valve of the present disclosure when a solenoid valve is in an excited (on) state.

Hereinafter, an exemplary embodiment of the present disclosure in which the object of the present disclosure may be specifically realized will be described in detail with reference to accompanying drawings. In the description of the present embodiment, the same names and the same reference numerals are used for the same elements, and an additional description thereof will be omitted.

In addition, in describing the embodiment of the present disclosure, the same name and the same reference numerals are used for elements having the same function, but it is noted that the elements are substantially completely the same as in the related art.

Terms used in the specification are used only to describe specific embodiments and are not intended to limit the present disclosure. A singular expression includes a plural expression unless the context clearly dictates otherwise.

In the embodiment of the present disclosure, terms such as "comprise" or "have" are intended to designate that a feature, number, step, operation, element, part, or a combination thereof described in the specification exists but should be understood not to preclude in advance the possibility of the existence or addition of one or more other features numbers, steps, operations, elements, parts, or combinations thereof.

A directional control hydraulic valve of the present disclosure may include a first valve and a second valve.

The first valve may control the flow of fluid flowing thereinto from a first input port 180 by being interlocked with a solenoid valve that is switched to an excited (on) state or a non-excited (off) state.

The second valve may be connected to the first valve and may control the flow of the fluid flowing thereinto from the first valve by the fluid flowing thereinto from a second input port 280 or a third input port 290.

In addition, at least a part of the fluid passing through the first valve is discharged through a first output port 190 and then may flow into the second input port 280 or the third input port 290.

Specifically, the part of the fluid passing through the first valve may flow to the first output port 190 along a fifth line 50 providing the fluid having passed through the first valve with a path in a direction of the first output port 190.

In addition, the rest except for the fluid flowing to the first output port 190 is branched off from the fifth line 50 and may flow into the second valve by a sixth line 60 providing a path in a direction of the second valve.

The first valve may include a first plunger 110, a first piston 120, a first body 130, a first seat 140, and a first frame providing a space allowing such elements to operate by being interlocked with each other.

In addition, the first valve may, for the flow of the fluid therein, include a first line 10, a second line 20, and a third line 30 which are paths through which the fluid flows.

The first line 10 may provide the fluid flowing thereinto from the first input port 180 with a movement path, and the second line 20 is branched off from the first line 10 to provide a path in a direction of a first plunger 110. In addition, the third line 30 may be branched off from the first line 10 or the second line 20 to provide a path in a direction of the first piston 120.

The first plunger 110 may be displaced by the fluid flowing thereto from the first input port 180 or by the solenoid valve.

For example, the first plunger 110 may be provided to be movable at one end part of the inside of the first frame. In addition, the fluid flowing into through the first input port 180 flows in a direction of the first plunger 110 along the path provided by the first line 10 and the second line 20 and then may flow into a space between the plunger 110 and the first frame. At this time, when the solenoid valve is in an excited state, the first plunger 110 may move in a first direction by the fluid flowing into the space between the first plunger 110 and the first frame.

The first piston 120 may be displaced by the fluid flowing thereto from the first input port 180 or the restoring force of a first elastic body 125.

For example, the first elastic body 125 may be provided at an opposite end part of the inside of the first frame to face the first plunger 110. In addition, the first piston 120 may be provided to be movable inside the first frame so as to receive the restoring force of the first elastic body 125. The fluid may flow into a space in which the first elastic body 125 is provided between the first piston 120 and the first frame along the third line 30. At this time, when the solenoid valve is in a non-excited state, a sum of a magnitude of force due to a hydraulic pressure applied to the first piston 120 by the fluid and magnitudes of the restoring force of the first elastic body 125 is greater than a magnitude of force due to a hydraulic pressure applied to the first plunger 110, so the first piston 120 may move in a second direction opposite to the first direction.

The first body 130 may be displaced by the first plunger 110 and the first piston 120 and may determine the flow of the fluid flowing thereinto from the first input port 180 according to the amount of displacement thereof.

Specifically, the first body 130 may include a first rod member 131 in a cylindrical shape and a pair of first contact members 135 at opposite end parts of the first rod member 131, wherein first rod member 131 and the pair of first contact members 135 are provided between the first plunger 110 and the first piston 120. At this time, in order to be in line contact with a portion of the first seat 140 as the first body 130 moves, each of the pair of first contact members 135 may have a cross section provided in a circular or wedge shape or may be provided in a poppet type.

In addition, the first seat 140 may be brought into contact with the first body 130 as the first body 130 is displaced, thereby determining the amount of displacement of the first body 130.

That is, the first seat 140 is fixed at a specific position inside the first frame, and the first body 130 is brought into contact with the first seat 140 while being moved, whereby the amount of displacement of the first body 130 may be limited.

In addition, the second valve include a second plunger 250, a second piston 210, a third piston 220, a second body 230, a second seat 240, and a second frame providing a space allowing such elements to operate by being interlocked with each other.

In addition, the second valve may, for the flow of the fluid therein, include an eighth line 80 and a ninth line 90 which are paths through which the fluid flows.

The eighth line 80 may provide the fluid flowing thereinto from the second input port 280 with a path in a direction of the second piston 210. In addition, the ninth line 90 may provide the fluid flowing thereinto from the third input port 290 with a path in a direction of the third piston 220.

The second plunger 250 may be displaced by the fluid flowing thereto from the first input port 180.

For example, the second plunger 250 may be provided to be movable at one end part of the inside of the second frame. In addition, the fluid may flow in a direction of the second plunger 250 along a fourth line 40 and may flow into a space between the second plunger 250 and the second frame, thereby pressing the second plunger 250, wherein the fourth line 40 provides a path in the direction of the second plunger by being branched off from the first line 10 that provides the fluid flowing therein from the first input port 180 with a movement path.

The second piston 210 may be displaced by the fluid flowing thereto from the second input port 280 or the restoring force of the second elastic body 215.

The third piston 220 may be displaced by the fluid flowing thereto from the third input port 290 or the restoring force of the third elastic body 225.

For example, the third elastic body 225, the third piston 220, the second elastic body 215, and the second piston 210 may be positioned in that order in the second frame. In addition, the second piston 210 and the third piston 220 may be provided to be movable. When the fluid flows into the second input port 280, the fluid flows between the third piston 220 and the second piston 210 along the eighth line 80 and may press the second piston 210. In addition, when the fluid flows into the third input port 290, the fluid flows into a space between the end part of the second frame and the third piston 220 along the ninth line 90 and may press the third piston 220. At this time, when the fluid flows into the second input port 280 or the third input port 290, a sum of a magnitude force due to the hydraulic pressure applied to the second piston 210 by the fluid and a magnitude of force due to the restoring force of the second elastic body 215 or a sum of a magnitude of force due to the hydraulic pressure applied to the third piston 220 by the fluid and a magnitude of the restoring force of the third elastic body 225 is greater than a magnitude of force due to the hydraulic pressure applied to the second plunger 250 by the fluid via the fourth line 40, so the second piston 210 or the third piston 220 may move in a direction of the second plunger 250.

The second body 230 may be displaced by at least one of the second plunger 250, the second piston 210, or the third piston 220 and may determine the flow of the fluid flowing thereinto from the first valve according to the displacement amount thereof.

Specifically, the second body 230 may include a second rod member 231 in a cylindrical shape and a second contact member 235 at one end part of the second rod member 231, wherein second rod member 231 and the second contact member 235 are provided between the second plunger 250 and the second piston 210. At this time, in order to be in line contact with a portion of the second seat 240 as the second body 230 moves, the second contact member 235 may have a cross section provided in a circular or wedge shape or may be provided in a poppet type.

In addition, the second seat 240 may be brought into contact with the second body 230 as the second body 230 is displaced, thereby determining the amount of displacement of the second body 230.

That is, the second seat 240 is fixed at a specific position inside the second frame, and the second body 230 is brought into contact with the second seat 240 while being moved, whereby the amount of displacement of the second body 230 may be limited.

In addition, the fluid having passed through the second valve may be discharged to a second output port 270 along a seventh line 70 that provides a path through which the fluid having passed the second valve is discharged to the second output port 270.

Figure 2:
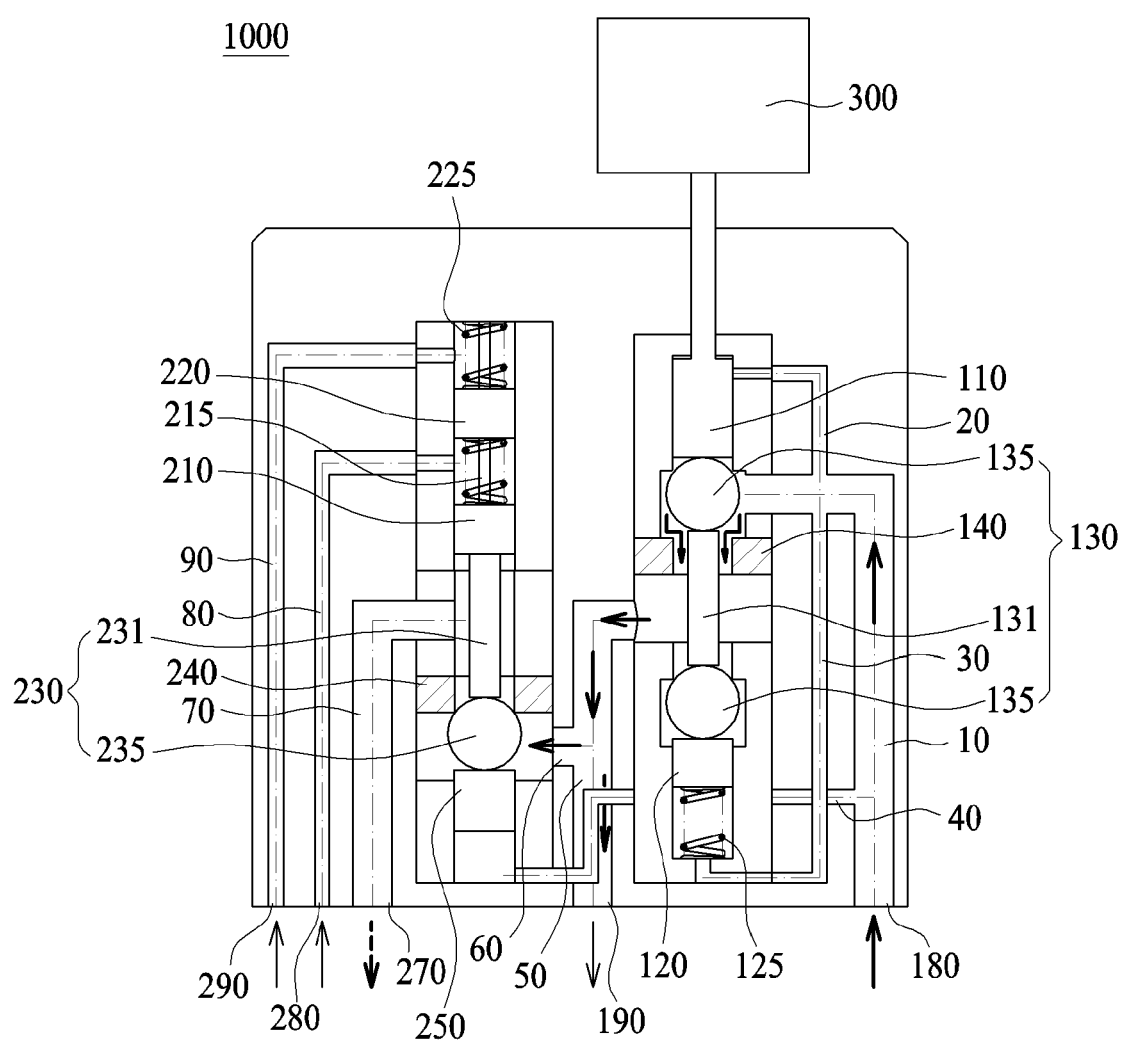
FIGS. 2 and 3 are views each showing a state and a flow of the fluid of the directional control hydraulic valve of the present disclosure when the solenoid valve is in a non-excited (off) state.
Figure 3:
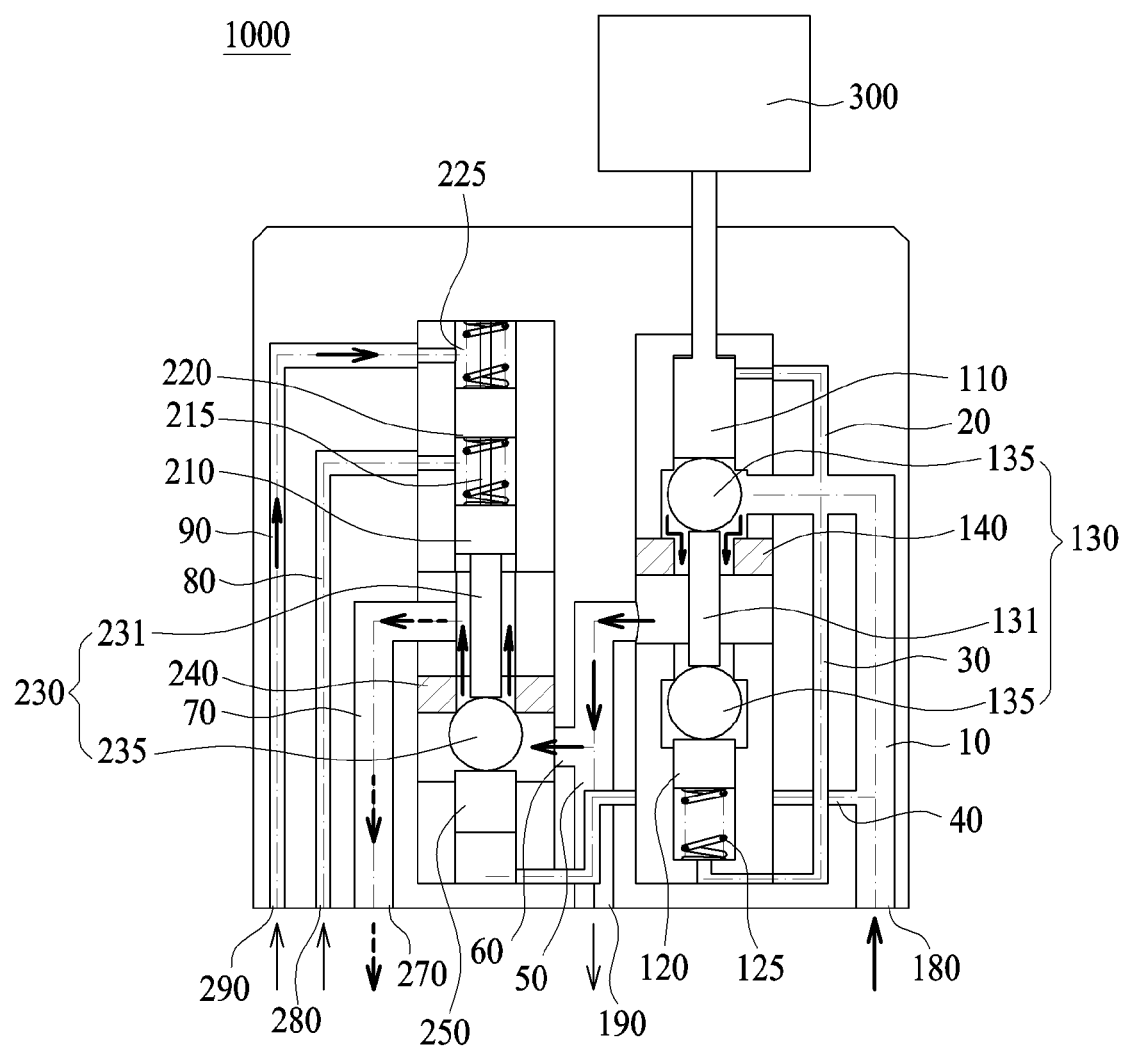

With reference to FIGS. 1 to 3, a relationship and interlocking between the respective elements of the directional control hydraulic valve of the present disclosure will be described. FIG. 1 is a view showing a state and a fluid flow of a directional control hydraulic valve of the present disclosure when a solenoid valve is in an excited (on) state. In addition, FIGS. 2 and 3 are views each showing a state and a flow of the fluid of the directional control hydraulic valve of the present disclosure when the solenoid valve is in a non-excited (off) state.

As shown in FIG. 1, when the solenoid valve is in an excited state, a sum of a magnitude of force due to a pressure applied to the first plunger 110 by the solenoid valve and a magnitude of force due to a hydraulic pressure flowing into a space between the first plunger 110 and the first frame through the second line 20 is greater than a sum of a magnitude of force due to a pressure of the fluid applied to the first piston 120 via the third line 30 and a magnitude of the restoring force of the first elastic body 125. Accordingly, the pair of the first contact members 135 of the first body 130 may move in a direction of the first seat 140 until a portion of an upper member of the pair of the first contact members 135 is brought into contact with the first seat 140. In addition, the fluid flowing into the first frame through the first line 10 becomes unable to flow between the first contact member 135 of the first body 130 and the first seat 140.

Next, as shown in FIG. 2, when the solenoid valve is switched to a non-excited state, the pressure applied to the first plunger 110 by the solenoid valve is removed. At this time, a sum of a magnitude of force due to the hydraulic pressure applied to the first piston 110 by the fluid and a magnitude of the restoring force of the first elastic body 125 is greater than a magnitude of force due to the hydraulic pressure applied to the first plunger 110 by the fluid. Accordingly, the upper member of the pair of the first contact members 135 of the first body 130 moves away from the first seat 140. In addition, the fluid flowing into the first frame through the first line 10 may pass through a gap between the upper member of the pair of the first contact members 135 of the first body 130 and the first seat 140 and move along the fifth line 50.

A part of the fluid flowing along the fifth line moves in a direction of the second valve along the sixth line 60, and the rest of the fluid is discharged through the first output port 190.

Finally, as shown in FIG. 3, the fluid discharged through the first output port 190 may flow into the second input port 280 or the third input port 290 connected to the first output port 190. When the fluid flows into the second input port 280 as described above, a sum of a magnitude of force due to a pressure of the fluid flowing into a space between the second piston 210 and the third piston 220 to press the second piston 210 and restoring force of the second elastic body 215 is greater than a magnitude of force due to the pressure to press the second plunger 250 along the fourth line 40. Accordingly, the second contact member 235 of the second body 230 moves away from the second sheet 240. In addition, the fluid flowing into the second frame through the sixth line 60 may pass through a gap between the second contact member 235 of the second body 230 and the second sea 240 and move to the second output port 270 along the seventh line 70. In the same manner, when the fluid flows into the third input port 290, a sum of a magnitude of force due to the pressure of the fluid flowing into a space between the end part of the second frame and the third piston 220 to press the third piston 220 and a magnitude of restoring force of the third elastic body 225 is greater than a magnitude of force due to the pressure to press the second plunger 250 along the fourth line 40. Accordingly, the second contact member 235 of the second body 230 moves away from the second sheet 240. In addition, the fluid flowing into the second frame through the sixth line 60 may pass through a gap between the second contact member 235 of the second body 230 and the second sea 240 and move to the second output port 270 along the seventh line 70.

At this time, it is self-explanatory to those ordinaries in the related art that whether the fluid discharged through the first output port 190 flows into the second input port 280 or the third input port 290 may be provided in various ways depending on the installation environment.

Figure 4:
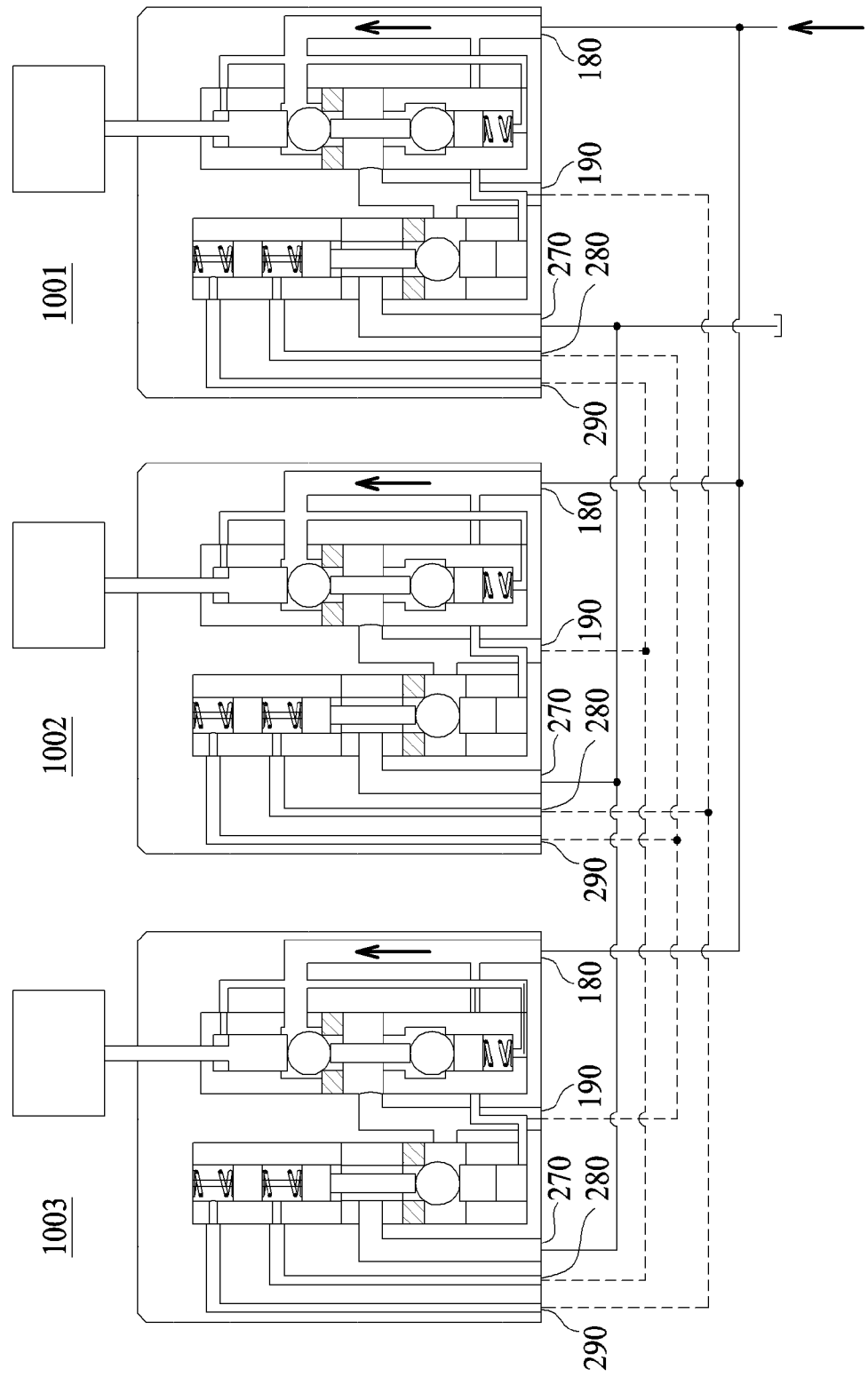
FIG. 4 is a view showing a case in which the directional control hydraulic valves of the present disclosure are connected in a 2 out of 3 configuration, and each of the solenoid valves is in an excited state.
Figure 5:
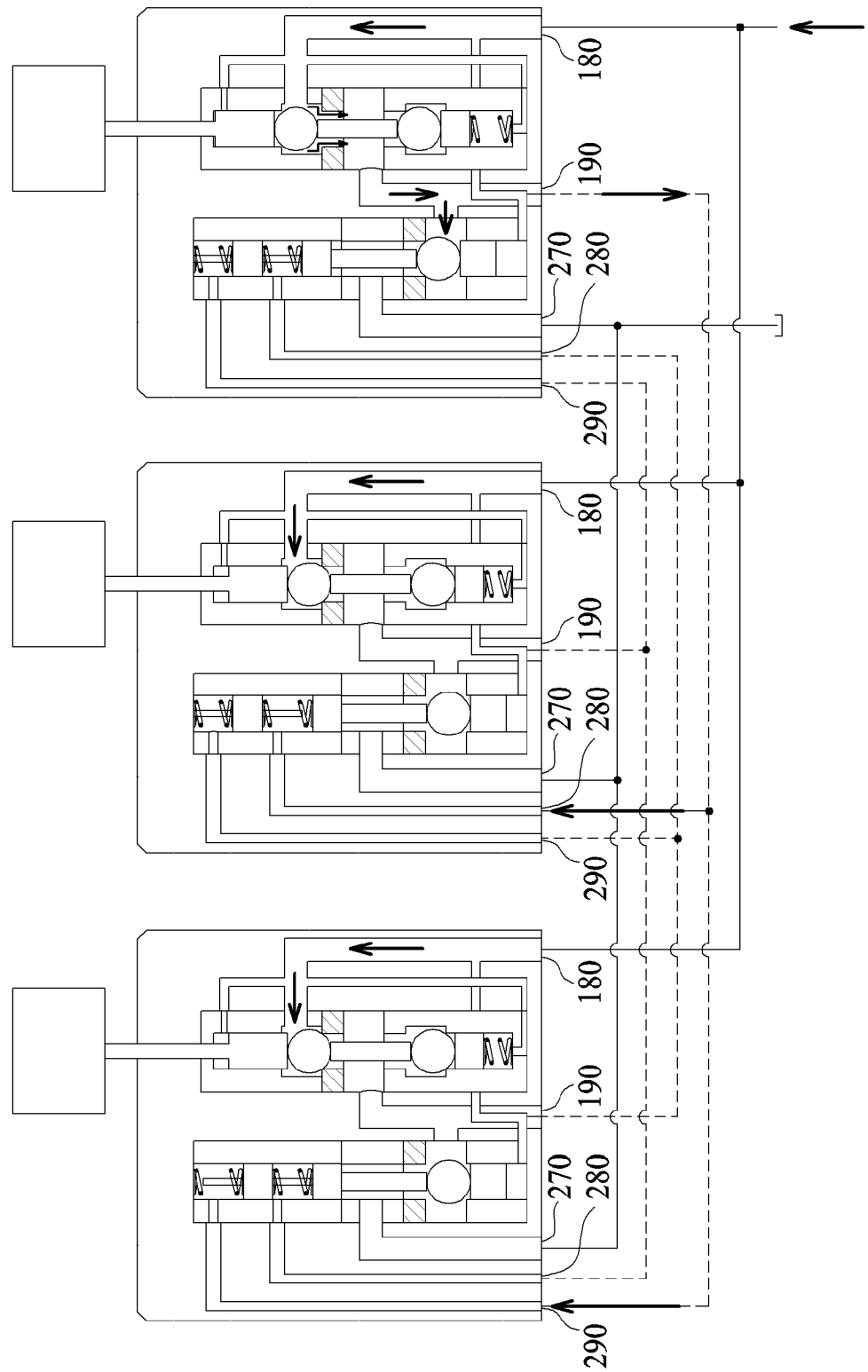
FIG. 5 is a view showing a case in which the directional control hydraulic valves of the present disclosure are connected in the 2 out of 3 configuration, and any one of the solenoid valves is in a non-excited state.
Figure 6:
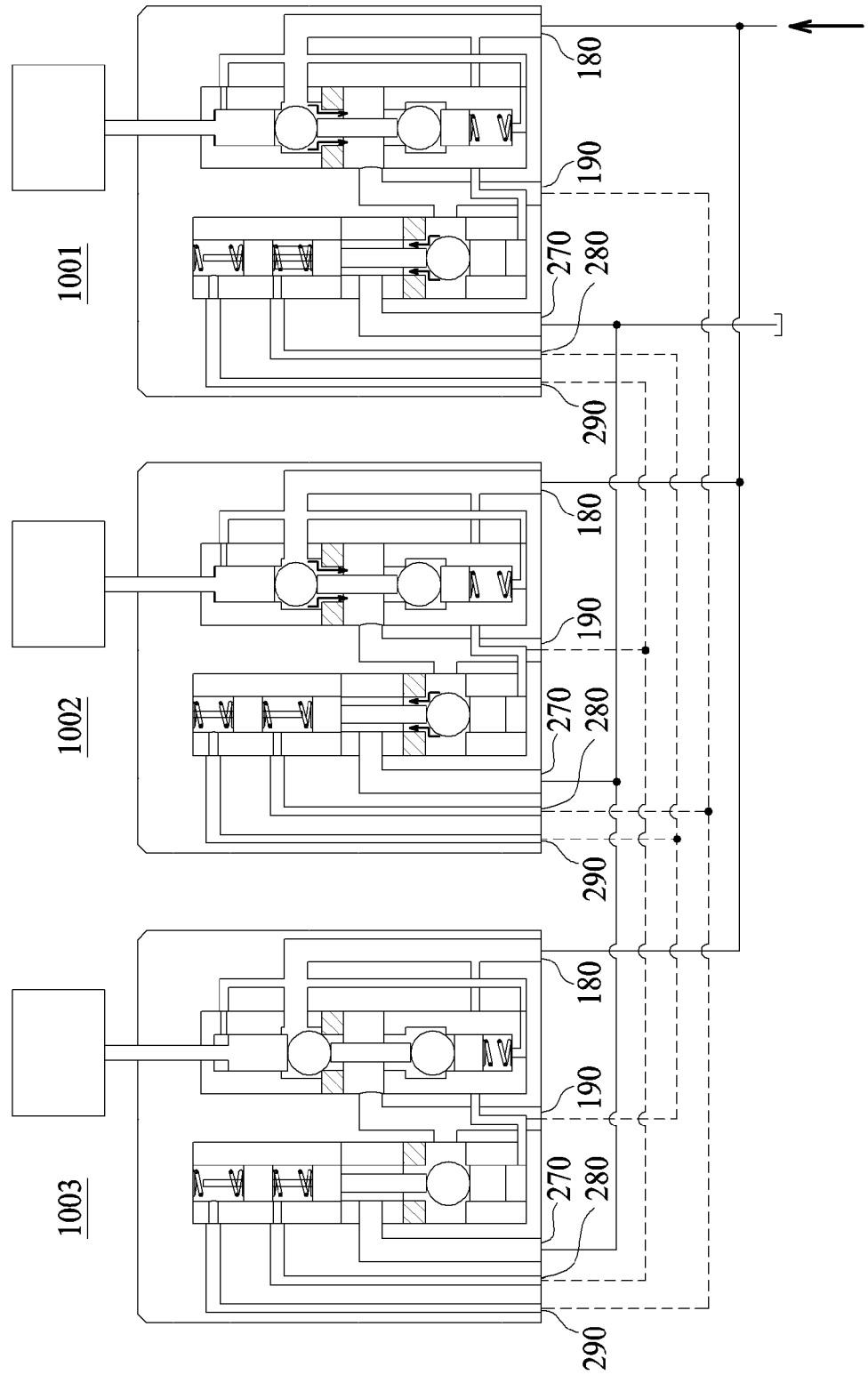
FIG. 6 is a view showing a case in which the directional control hydraulic valves of the present disclosure are connected in the 2 out of 3 configuration, and at least two solenoid valves are in a non-excited state.

With reference to FIGS. 4 to 6, it will be described for an operation when so-called a 2 out of 3 configuration is provided by connecting a plurality of directional control hydraulic valves of the present disclosure. FIG. 4 is a view showing a case in which the directional control hydraulic valves of the present disclosure are connected in a 2 out of 3 configuration, and each of the solenoid valves is in an excited state, and FIG. 5 is a view showing a case in which the directional control hydraulic valves of the present disclosure are connected in the 2 out of 3 configuration, and any one of the solenoid valves is in a non-excited state. In addition, FIG. 6 is a view showing a case in which the directional control hydraulic valves of the present disclosure are connected in the 2 out of 3 configuration, and at least two solenoid valves are in a non-excited state.

For the convenience of explanation, the directional control hydraulic valves are respectively denoted by 1001, 1002, and 1003 and may be configured to have the same or similar function as the directional control hydraulic valve of the present disclosure described above.

As shown in FIG. 4, when all of the solenoid valves are in an excited state, the fluid flowing into each first input port is blocked between the upper member of the pair of the first contact members and the first seat of the first body and is unable to move.

Next, as in FIG. 5, when the solenoid valve, which is in one arbitrary directional control hydraulic valve, 1001 in this case, is in a non-excited state, the fluid flowing into the first input port of the directional control hydraulic valve 1001 passes through the first valve of the directional control hydraulic valve 1001, thereby being discharged through the first output port of the directional control hydraulic valve 1001. The fluid discharged from the first output port of the directional control hydraulic valve 1001 flows to the second input port of the directional control hydraulic valve 1002 and the third input port of the directional control hydraulic valve 1003.

Finally, as shown in FIG. 6, when the two solenoid valves in the directional control hydraulic valves 1001 and 1002 are in a non-excited state, by the driving of the above-described directional control hydraulic valve, the fluid flowing into the first input port of the directional control hydraulic valve 1001 is discharged through the first output port of the directional control hydraulic valve 1001. Likewise, the fluid flowing into the first input port of the directional control hydraulic valve 1002 is discharged through the first output port of the directional control hydraulic valve 1002.

Figure 7:
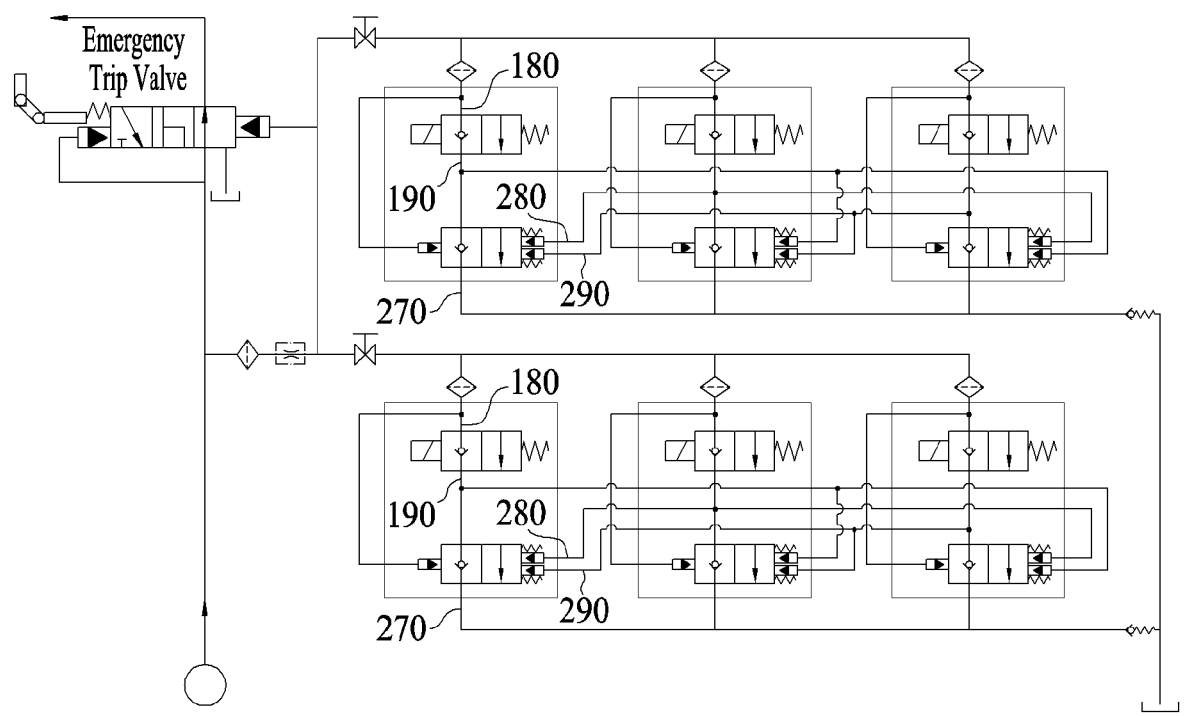
FIG. 7 is a diagram showing a system including directional control hydraulic valves of the present disclosure in the case in which the solenoid valve is in an excited state.
Figure 8:
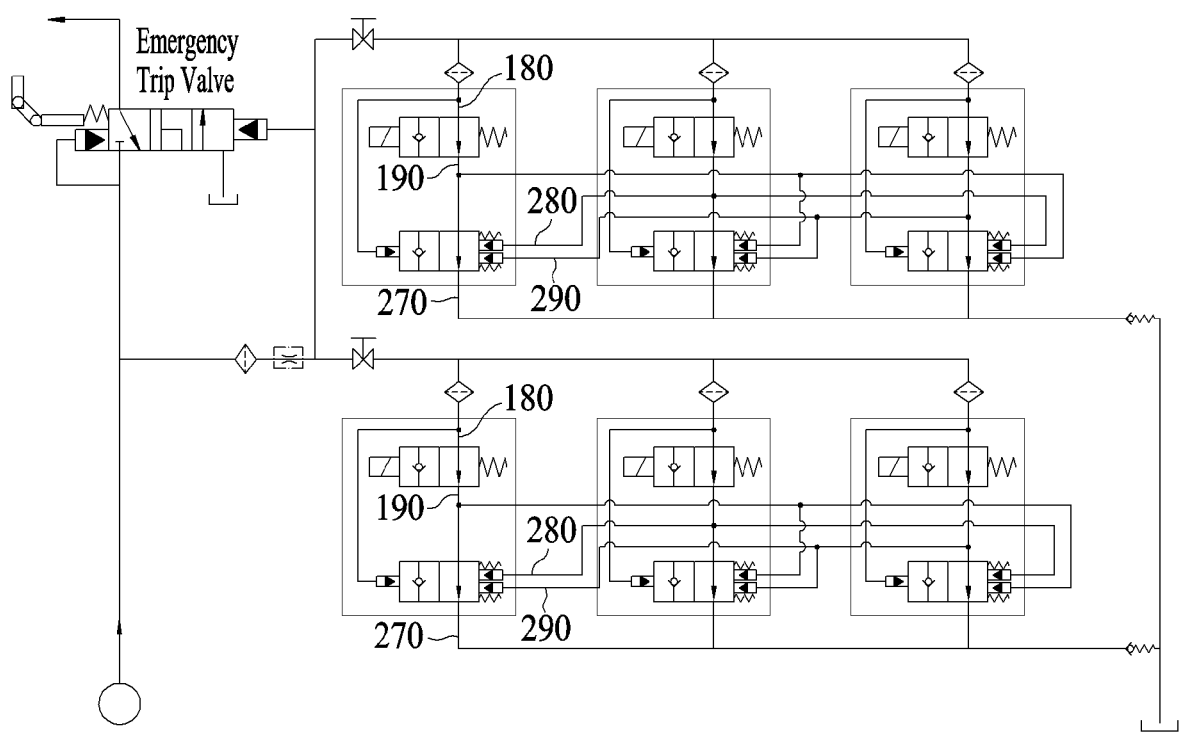
FIG. 8 is a diagram showing the system including the directional control hydraulic valves of the present disclosure in the case in which the solenoid valve is in a non-excited state.

Hereinafter, a system including the directional control hydraulic valves of the present disclosure described above with reference to FIGS. 7 and 8 will be described. In relation to the system including the directional control hydraulic valves of the present disclosure to be described below, the description of the directional control hydraulic valve may be replaced with the description of the directional control hydraulic valve of the present disclosure described above. That is, when the terms described in the system including the directional control hydraulic valve of the present disclosure described below are the same as the terms described in the directional control hydraulic valve of the present disclosure described above, the terms may be understood as a similar configuration that they have the same or similar purpose and implement the same or similar effects. FIG. 7 is a diagram showing a system including directional control hydraulic valves of the present disclosure in the case in which the solenoid valves are in an excited state, and FIG. 8 is a diagram showing the system including the directional control hydraulic valves of the present disclosure in the case in which the solenoid valves are in a non-excited state.

A directional control hydraulic valve system of the present disclosure may include one directional control hydraulic valve that is connected to at least two other directional control hydraulic valves. At this time, the directional control hydraulic valve includes: a first valve configured to control a flow of a fluid flowing thereinto from a first input port thereof by being interlocked with a solenoid valve that is switched to an excited (on) state or a non-excited (off) state; and a second valve connected to the first valve and configured to control a flow of a fluid flowing thereinto from the first valve by a fluid flowing thereinto from a second input port or a third input port thereof, wherein at least a part of the fluid having been passed through the first valve is discharged through a first output port and flows into the second input port or the third input port.

In addition, the system including the directional control hydraulic valves further includes a trip valve configured to control whether performing an emergency stop of the hydraulic system or not by being interlocked with the directional control hydraulic valves, wherein, when at least three directional control hydraulic valves are provided, the trip valve operates only when at least two out of the solenoid valves respectively included in the directional control hydraulic valves, are in a non-excited state.

That is, the directional control hydraulic valve system of the present disclosure may connect the directional control hydraulic valves of the present disclosure described above in a 2 out of 3 configuration. The connection in a 2 out of 3 configuration may be understood that the trip valve is operated when the solenoid valves provided in two of the directional control hydraulic valves among three of the directional control hydraulic valves are in a non-excited state as in the related art. However, this is only one preferred configuration, and the case, in which the trip valve operates when the solenoid valve is in an excited (on) state, may also be taken into consideration, and this is apparent to those skilled in the art.

For example, as in FIGS. 4 and 7, when the solenoid valves provided in three of the directional control hydraulic valves are each in an excited state, or as in FIGS. 5 and 7, when any two of the solenoid valves provided in three of the directional control hydraulic valves are each in an excited state, the trip valve does not operate. However, as shown in FIGS. 6 and 8, when at least two of the solenoid valves provided in three of the directional control hydraulic valves are in a non-excited state, the trip valve may operate to induce the emergency stopping of a turbine.

As described above, exemplary embodiments according to the present disclosure have been reviewed, and the fact that the present disclosure may be embodied in other specific forms without departing from the spirit or scope of the present disclosure in addition to the above-described embodiments is obvious to those ordinary skilled in the art. Therefore, the above-described embodiments are to be regarded as illustrative rather than restrictive, and accordingly, the present disclosure is not limited to the above description but may be modified within the scope of the appended claims and equivalents thereof.

DESCRIPTION OF THE REFERENCE NUMERALS IN THE DRAWINGS

110 First plunger
120 First piston
125 First elastic body
130 First body
131 First rod member
135 First contact member
140 First seat
180 First input port
190 Second input port
210 Second piston
215 Second elastic body
220 Third piston
225 Third elastic body
230 Second body
231 Second rod member
235 Second contact member
240 Second seat
250 Second plunger
270 Second output port
280 Second input port
290 Third input port
1000 Directional control hydraulic valve

INDUSTRIAL APPLICABILITY

According to the present disclosure, even when there occurs a phenomenon such that some of a plurality of solenoid valves are switched due to faults thereof, a trip system does not operate and a turbine may be maintained under control, so the present disclosure has industrial applicability.

In addition, separate maintenance or testing is possible for only some of the solenoid valves among the plurality of solenoid valves, so the present disclosure has industrial applicability.

In addition, manufacturing and maintenance are advantageous by unifying elements, so the present disclosure has industrial applicability.

In addition, by removing a gap between a body and a seat of the directional control hydraulic valve, it is possible to prevent foreign substances from being introduced and fixed, so the present disclosure has industrial applicability.

In addition, it is possible to minimize a leakage phenomenon that proceeds through the gap between the body and the seat of the directional control hydraulic valve, so the present disclosure has industrial applicability.

In addition, by preventing the sticking of foreign substances and the leakage phenomenon, it is possible to improve the reliability of the directional control hydraulic valve, so the present disclosure has industrial applicability.

In addition, even when a phenomenon occurs that some of the plurality of solenoid valves are not switched even in a trip signal due to the sticking thereof, when at least two valves are operated, a normal trip system may be operated, so the present disclosure has industrial applicability.

The invention claimed is:

1. A directional control hydraulic valve system comprising directional control hydraulic valves in which any one directional control hydraulic valve is connected to at least two other directional control hydraulic valves, wherein each of the directional control hydraulic valves comprises:
   a first valve configured to control a flow of a fluid flowing thereinto from a first input port, by being interlocked with a solenoid valve that is switched to an excited (on) state or non-excited (off) state; and
   a second valve connected to the first valve and configured to control a flow of the fluid flowing thereinto from the first valve, by a fluid flowing thereinto from a second input port or a third input port,
   wherein at least a part of the fluid having been passed through the first valve is discharged through a first output port and then flows into the second input port or the third input port, and
   wherein the first valve comprises:
   a first plunger configured to be displaced by the fluid flowing thereto from the first input port or by the solenoid valve;
   a first piston configured to be displaced by the fluid flowing thereto from the first input port or by restoring force of a first elastic body;
   a first body configured to be displaced by the first plunger and the first piston and to determine the flow of the fluid flowing thereinto from the first input port according to an amount of displacement thereof; and
   a first seat configured to be brought into contact with the first body as the first body is displaced, thereby determining the amount of displacement of the first body.

2. The system of claim 1, further comprising:
   a trip valve configured to control whether performing an emergency stop of the system or not by being interlocked with the directional control hydraulic valves,
   wherein, when at least three of the directional control hydraulic valves are provided, the trip valve operates only when at least two of the solenoid valves respectively included in the directional control hydraulic valves, are in a non-excited state.

3. A directional control hydraulic valve, comprising:
   a first valve configured to control a flow of a fluid flowing thereinto from a first input port, by being interlocked with a solenoid valve that is switched to an excited (on) state or non-excited (off) state; and
   a second valve connected to the first valve and configured to control a flow of the fluid flowing thereinto from the first valve, by a fluid flowing thereinto from a second input port or a third input port,
   wherein at least a part of the fluid having been passed through the first valve is discharged through a first output port and then flows into the second input port or the third input port, and
   wherein the first valve comprises:
   a first plunger configured to be displaced by the fluid flowing thereto from the first input port or by the solenoid valve;
   a first piston configured to be displaced by the fluid flowing thereto from the first input port or by restoring force of a first elastic body;
   a first body configured to be displaced by the first plunger and the first piston and to determine the flow of the fluid flowing thereinto from the first input port according to an amount of displacement thereof; and
   a first seat configured to be brought into contact with the first body as the first body is displaced, thereby determining the amount of displacement of the first body.

4. The valve of claim 3, wherein the first valve comprises:
   a first line configured to provide the fluid flowing thereinto from the first input port with a movement path;
   a second line branched off from the first line to provide a path in a direction of a first plunger; and
   a third line branched off from the first line or the second line to provide a path in a direction of the first piston.

5. The valve of claim 3, wherein the first body, in order to be in line contact, as being moved, with a portion of the first seat, has a cross section provided in a circular or wedge shape or is provided in a poppet type.

6. A directional control hydraulic valve, comprising:
   a first valve configured to control a flow of a fluid flowing thereinto from a first input port, by being interlocked with a solenoid valve that is switched to an excited (on) state or non-excited (off) state; and
   a second valve connected to the first valve and configured to control a flow of the fluid flowing thereinto from the first valve, by a fluid flowing thereinto from a second input port or a third input port,
   wherein at least a part of the fluid having been passed through the first valve is discharged through a first output port and then flows into the second input port or the third input port, and
   wherein the second valve comprises:
   a second plunger configured to be displaced by the fluid flowing thereto from the first input port;
   a second piston configured to be displaced by the fluid flowing thereto from the second input port or by restoring force of a second elastic body;
   a third piston configured to be displaced by the fluid flowing thereto from the third input port or by restoring force of a third elastic body;
   a second body configured to be displaced by at least one of the second plunger, the second piston, and the third piston and to determine a flow of the fluid flowing thereinto from the first valve according to an amount of displacement thereof; and a second seat configured to be brought into contact with the second body as the second body is displaced, thereby determining the amount of displacement of the second body.

7. The valve of claim 6, wherein the first valve comprises a fourth line configured to provide a path in a direction of the second plunger by being branched off from the first line that provides the fluid flowing thereinto from the first input port with a movement path.

8. The valve of claim 6, wherein the second valve comprises an eighth line configured to provide the fluid flowing thereinto from the second input port with a path in a direction of the second piston.

9. The valve of claim 6, wherein the second valve comprises a ninth line configured to provide the fluid flowing thereinto from the third input port with a path in a direction of the third piston.

10. The valve of claim 6, wherein the second body, in order to be in line contact, as being moved, with a portion of the second seat, has a cross section provided in a circular or wedge shape or is provided in a poppet type.

11. The valve of claim 3, further comprising:
a fifth line configured to provide the fluid having passed through the first valve with a path in a direction of the first output port.

12. The valve of claim 11, further comprising:
a sixth line configured to provide a path in a direction of the second valve by being branched off from the fifth line.

13. The valve of claim 3, further comprising:
a seventh line configured to provide a path through which the fluid having passed the second valve is discharged to the second output port.

* * * * *